Figure 1:
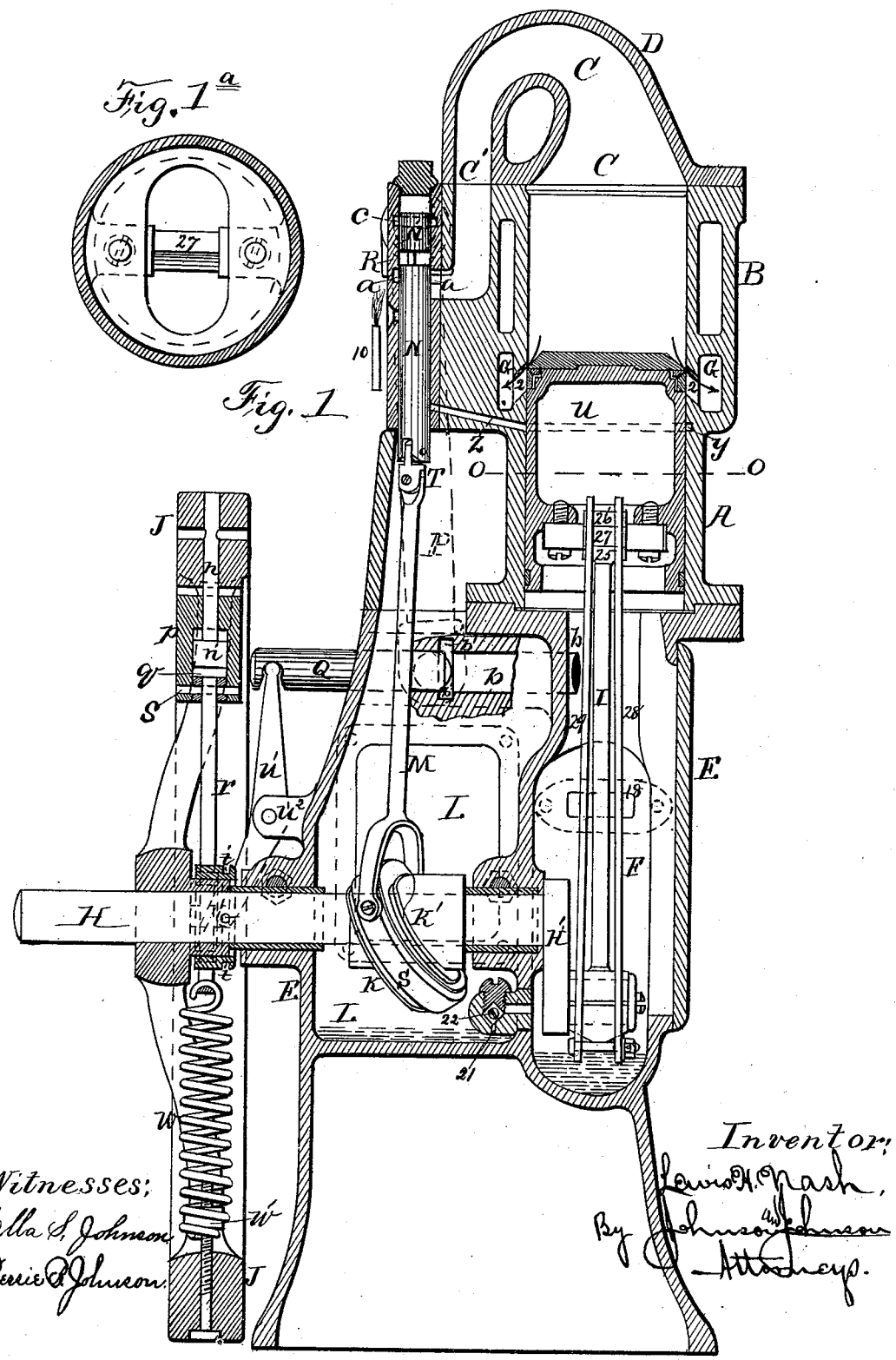

(No Model.) 5 Sheets—Sheet 1.

L. H. NASH.
GAS ENGINE.

No. 386,208. Patented July 17, 1888.

Fig. 1ᵃ

Witnesses:
Ella S. Johnson
Bessie D. Johnson

Inventor:
Lewis H. Nash,
By Johnson & Johnson
Attorneys.

(No Model.)   L. H. NASH.   5 Sheets—Sheet 2.
GAS ENGINE.
No. 386,208.   Patented July 17, 1888.
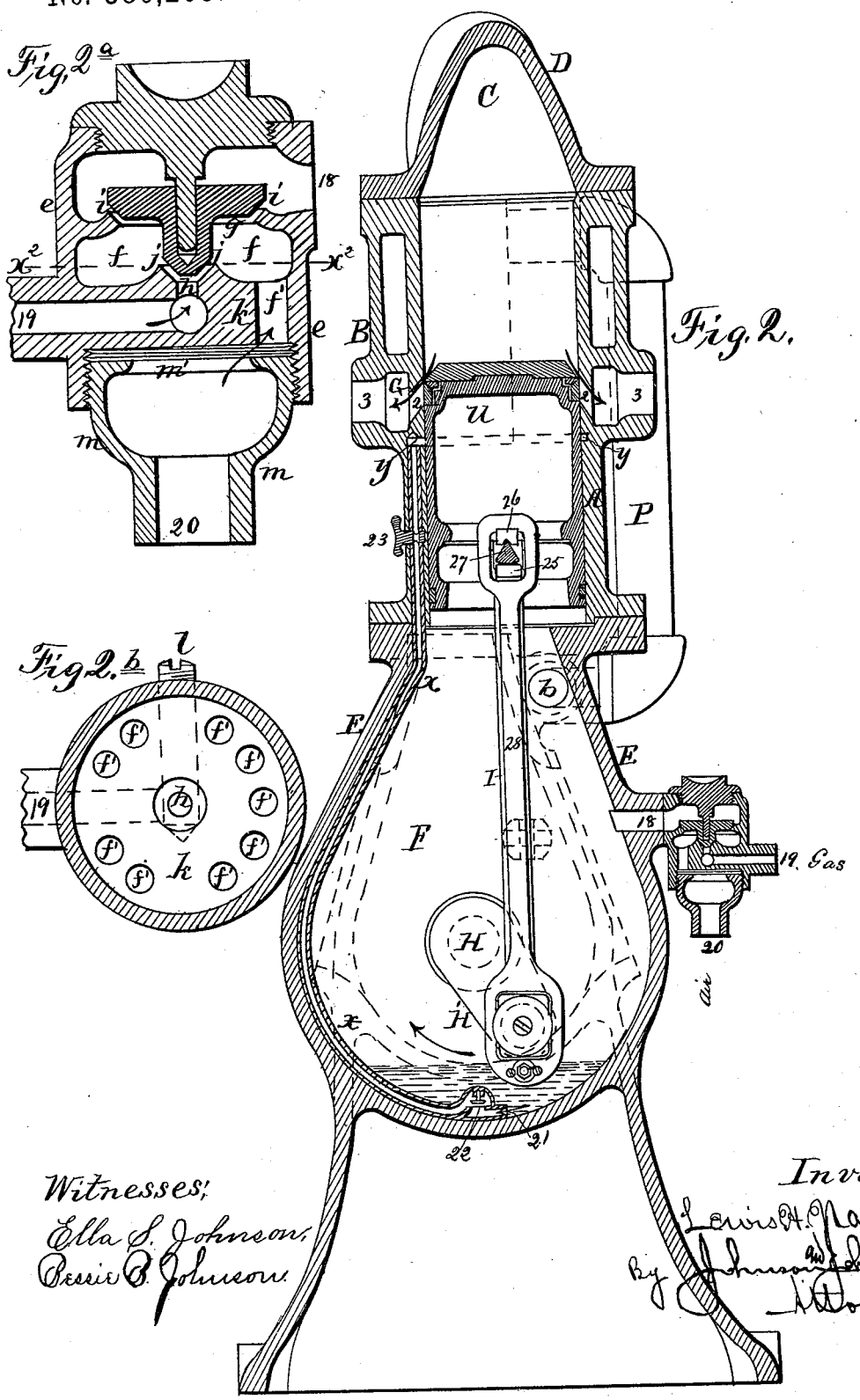

(No Model.) 5 Sheets—Sheet 3.
L. H. NASH.
GAS ENGINE.
No. 386,208. Patented July 17, 1888.
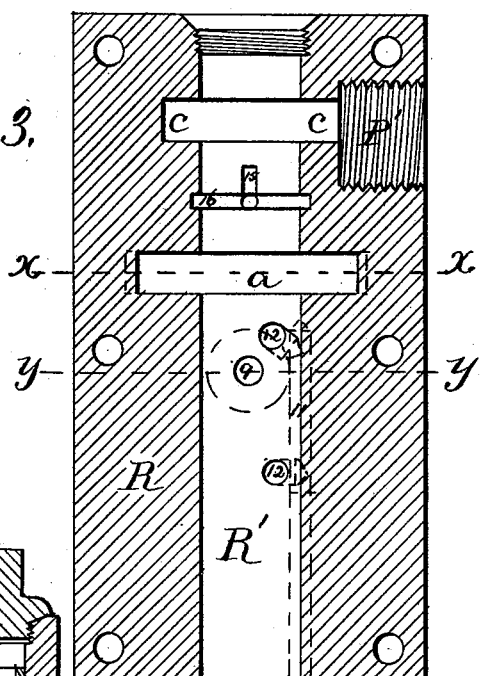
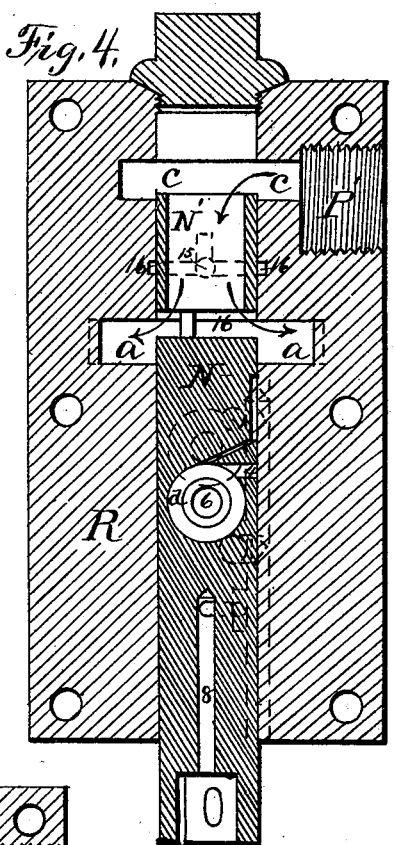
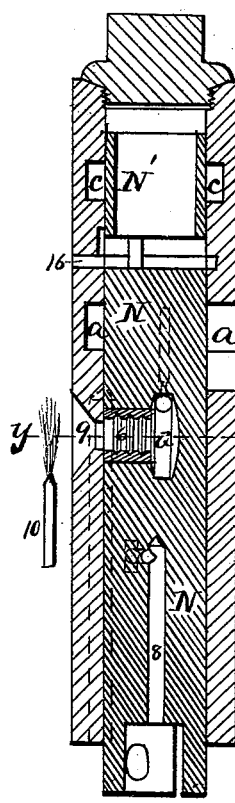
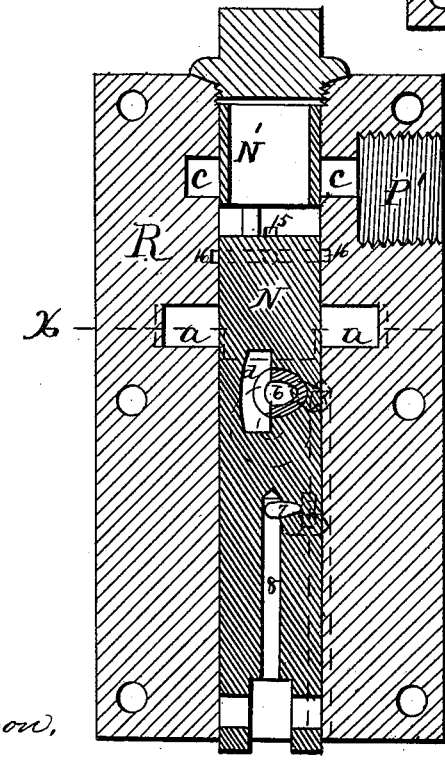
Witnesses:
Ella S. Johnson.
Bessie P. Johnson.
Inventor:
Lewis H. Nash.
By Johnson and Johnson
Attorneys (No Model.) 5 Sheets—Sheet 4.
L. H. NASH.
GAS ENGINE.
No. 386,208. Patented July 17, 1888.
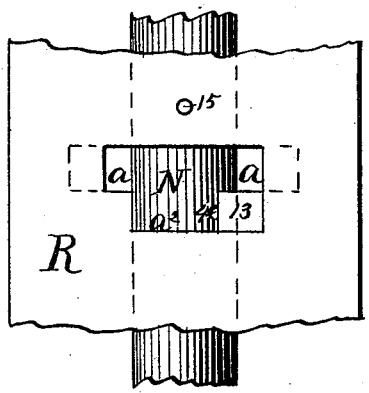
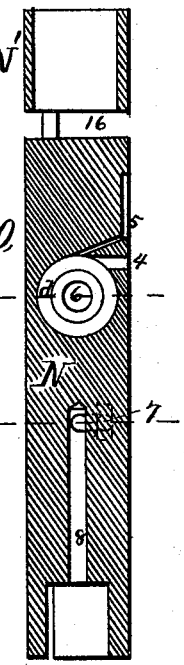
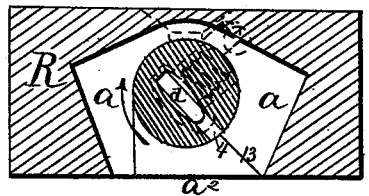
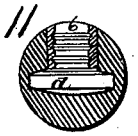
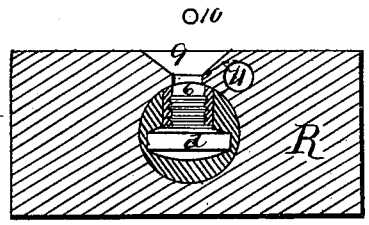
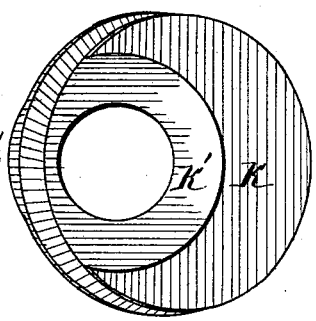
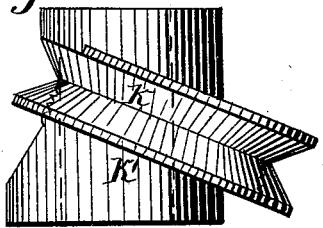
Witnesses:
Ella S. Johnson,
Jessie P. Johnson.
Inventor:
Lewis H. Nash.
By Johnson & Johnson
Attorneys (No Model.) 5 Sheets—Sheet 5.
L. H. NASH.
GAS ENGINE.
No. 386,208. Patented July 17, 1888.
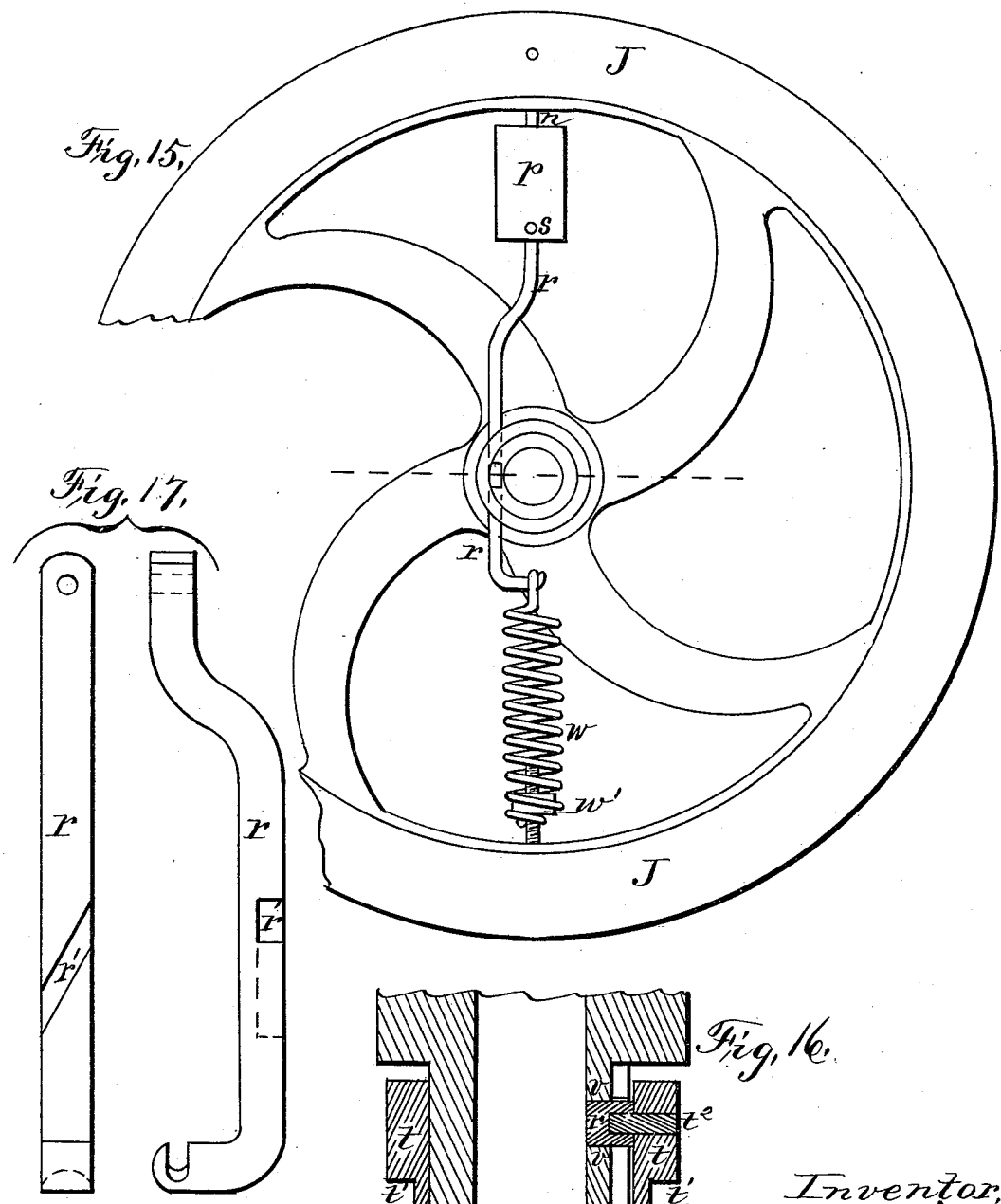
Witnesses:
Ella S. Johnson
Bessie P. Johnson
Inventor,
Lewis H. Nash
By Johnson & Johnson
Attorneys

United States Patent Office.

LEWIS HALLOCK NASH, OF BROOKLYN, ASSIGNOR TO THE NATIONAL METER COMPANY, OF NEW YORK, N. Y.

GAS-ENGINE.

SPECIFICATION forming part of Letters Patent No. 386,208, dated July 17, 1888.

Application filed October 6, 1886. Serial No. 215,419. (No model.)

*To all whom it may concern:*

Be it known that I, LEWIS HALLOCK NASH, a citizen of the United States, residing at Brooklyn, in the county of Kings and State of New York, have invented new and useful Improvements in Gas-Engines, of which the following is a specification.

I have improved the gas-engine; and the objects of my improvements are to operate the engine with a combustible mixture of uniform proportions; to provide for governing an engine using such a mixture; to supply such a mixture to the engine as fast as it may be used; to prevent the premature ignition of the charge; to prevent the flame from the power-cylinder from being communicated back to the supply-reservoir; to prevent the leakage of the supply-valve from fouling the supply for the engine; to provide continuous lubrication for the working parts; to utilize the action of the compression-pump of the engine to automatically effect the lubrication of the working parts; to render the operation of the engine reliable; to simplify the construction of the engine; to secure durability in the working parts and economy of construction and of operation, and to provide for the admission of the charge, its ignition, prevent the fouling of the supply, and prevent the back passage of the flame by a plunger-valve having a compound movement. These objects are effected by the engine illustrated in the accompanying drawings, in which—

Figure 1 represents in vertical section a gas-engine embracing my improvements. Fig. 1ª is a cross-section of the piston on the line $o\ o$ of Fig. 1. Fig. 2 represents a vertical section of the engine, taken at right angles to the line of section of Fig. 1. Fig. 2ª represents in vertical section the mixing-valve, and Fig. 2ᵇ shows a cross-section thereof on the line $x^2\ x^2$ of Fig. 2ª. Fig. 3 represents a longitudinal central section of the case of the supply-valve, showing the ports and the passages therein. Fig. 4 is a longitudinal central section of the valve and its case, showing the valve in the position to admit the charge. Fig. 5 shows a view like Fig. 4, showing the valve in the position to ignite the charge. Fig. 6 shows a longitudinal section taken at right angles to the section line of Fig. 5, showing the valve in the position it occupies when the flame is communicated from the external lighter to the ignition-chamber. Fig. 7 shows a cross-section of the valve and its case, taken on the line $x\ x$ of Fig. 5; and Fig. 8 shows a similar section taken on the line $y\ y$ of Fig. 6. Fig. 9 is a detail face view of the valve-case, showing the form of the inlet supply-opening shown in cross section in Fig. 7. The valve is shown in Figs. 10, 11, and 12 in longitudinal and in cross-sections, Fig. 11 being taken through the ignition-chamber, and Fig. 12 being taken through one of the valve-ports. Fig. 13 shows the supply-valve operating oblique eccentric in side view, and Fig. 14 shows the same in face view. Figs. 15, 16, and 17 show views of the fly-wheel governor device, Fig. 16 being a detail sectional view of the wheel-hub, and Fig. 17 shows the weight-connecting link.

The engine shown is of the vertical type, and the power-cylinder A is surrounded by a cooling-jacket, B. The combustion or power chamber C, formed partly in a separate hood, D, communicates at one side of the latter with the supply-valve port. The forward end of the power-cylinder opens into a casing, E, of the frame, which forms a compression supply-chamber, F, for the engine, of which the piston is the compressor. An exhaust-passage, G, is formed by the jacket around the cylinder, and opens into the chamber of the latter by a series of ports, 2, at about the middle of the length of the cylinder, and the jacket has one or more outlet-ports, 3, for the escape of the gases.

The power-transmitting crank-shaft H is mounted in the engine-casing E, so that its crank H' and the piston-connections I of the latter are inclosed and operate within the supply compression-chamber.

The fly-wheel J is secured upon the crank-shaft outside of the casing, and the supply-valve operating eccentric K is secured upon said shaft within a closed chamber, L, of the casing, within which the valve-connecting rod M also operates, so that the piston and valve operating parts are inclosed to prevent the splashing of the lubricant.

The back end of the combustion-chamber G is contracted and has somewhat the form of a bugle, the smaller end, C', communicating with the supply-port a of a valve, N, which forms both the supply and the ignition valve, while the larger end of said combustion-chamber is formed by the power-cylinder, so that the supply enters the combustion-chamber from the small end to the larger end, expanding in its flow, while the flame for the ignition of the charge follows in the same direction from the same valve, which is arranged at the side of the cylinder. This valve also has provision for preventing the leakage from the power or combustion cylinder from fouling the succeeding charge. The compression-chamber F communicates by a passage, b, with a pipe, P, which opens into the valve-chamber port c, Fig. 1, and such communication is controlled by a governor-valve, Q, fitted into said passage b, so as to open and to close the port b' of the passage b, to increase or to diminish the flow of the charge under the action of the governor. This valve Q serves to permit the flow of a certain quantity of the combustible mixture to form the charge and to retain the surplus mixture within the compression-chamber, and such function is preferably controlled by a governor automatically in a way that I will presently describe. It may, however, be controlled by means not automatic, such as an ordinary screw-cock.

The supply-valve case R has a cylindrical longitudinal valve-chamber, R', within which is fitted the cylindrical valve N, within the interior body of which is formed the ignition-chamber d, having a tangential ignition-port, 4, a tangential supply-port, 5, and a central ignition-port, 6, opening at right angles to the tangential ports. The ignition-chamber d is of circular form and its central ignition-port, 6, has a bushing to give the required size to such port. A lateral port, 7, opens at the side of the valve and communicates with a central longitudinal passage, 8, which opens at the lower end of the valve.

The supply-passage P' is formed at one end of the valve-case and opens into the valve-chamber port c, while the engine-supply port a opens at the side of the case and surrounds the valve. Below the supply-port a the ignition-port 9 is formed, so as to communicate the flame from an external lighter-jet, 10, to the ignition-chamber d in the operation of the valve. An inclosed passage, 11, is formed in the wall of the case and opens into the valve-chamber at two points, 12, which forms an escape for the gases from the ignition-chamber while the ignition-port 4 for the combustion-chamber is opening. The supply-port a has its inlet-opening formed with a lower enlarged part, $a^2$, Fig. 9, in such manner as to form an angular wall projection, 13, within the said port, into which enlarged part the ignition-port 4 of the valve opens at the point when the valve is turning in its seat to ignite the charge and passes the edge of said projection.

However tight the supply-valve of a gas-engine is made to work, its joint-forming contact will wear, so as to permit leaking from back-pressure and foul the charge so as to seriously interfere with the operation of the engine. I provide a perfect remedy for this difficulty, so that however badly the valve may leak the waste gases cannot be forced back into the supply. Such provision I have shown in a plug-valve; but it may be used in any form of valve—as, for instance, that shown and described in my patent dated February 17, 1885, No. 312,494. This provision consists in providing the valve-case with a separate valve-controlled port, c, opening into the fuel-supply passage P', and a separate valve-controlled port, a, communicating with the combustion-chamber, and between these ports there is an escape-port, 15, which separates the joint-forming bearings of the two case-ports, and is open to the outer air, as in Fig. 6. Such case-ports are shown as surrounding the valve, and the intermediate escape-port, 15, open to the air through the valve-case, and also inclosing the valve. The valve has two separated bearing-faces, one controlling each of the said ports, and a division-space, 16, Fig. 10, is formed between these bearing-faces, into which the leakage from the separated valve bearing-faces may escape, and thus avoid all possible chance for being forced into the supply-passage, because in such position of the valve both the supply-ports are closed by the valve and any gases that leak by the bearing-surfaces will pass into and away through the escape-port.

In the construction shown one of the bearing-face sections N' of the valve has a central passage which opens into the division-space 16, whereby to make communication between the two ports when the valve is admitting the charge to the power-cylinder. In this provision it is immaterial whether the escape-passage 15 be formed in valve-case or in the valve, so long as it separates the joint-forming surfaces of the two supply-ports when they are closed.

The upper end of the valve-chamber is closed by a plug. The case-wall passage 11 is not necessary in a quickly-moving valve.

The supply-valve is operated from the crank-shaft by an eccentric, K, of peculiar construction, as I shall now describe. Upon the shaft is secured a hub, K', having an eccentric disk-bearing turned with its axis oblique to the axis of the shaft, and having a circumferential V-shaped groove to receive a bearing-ring, S, to which is pivoted the valve-connecting rod M, which has a universal-joint connection, T, with said valve. It is this peculiar eccentric connection that gives a combined reciprocating and turning or twisting movement, which will be hereinafter described in the operation of the engine. In an engine where the valve-connection can be made at the end of the crank-shaft, a crank-pin set obliquely may take the place of the oblique eccentric.

Referring to the function of the valve to prevent back-pressure from the combustion or power chamber fouling the charge, the construction by which this is effected serves also the important function of preventing the flame from the combustion-chamber from being communicated back to the supply. In my experiments I used a lifting check-valve in the supply-pipe, which communicated directly with the combustion-chamber, so that the back-pressure of the gases in the combustion-chamber would act to close said valve. I found that such valve could not be relied upon, however perfect its seating, as the valve would wear out of perfect joint, and that it was also liable to collect foreign matter—such as dirt and flakes of burned oil—which would prevent its tight closing, and this caused leakage, fouling the supply, as well as allowing the flame to pass under the valve and ignite the mixture in the supply-reservoir. I found that a sudden explosion of the charge in the combustion-chamber would often transmit the flame under the bearing-face of the lift-valve, however perfect its seating, and that this result would take place from the rebound of the valve caused by the sudden impact from the explosion. I provide against this serious difficulty of a check-valve by the use of a positively-moving, preferably a sliding, valve for controlling the admission of the charge, which can have no such rebound and no uncertain action, and by the provision of an escape-passage for the flame should it leak, by the bearing-surfaces of the valve, because, now supposing the flame to run along the joint-forming faces of the valve from the cylinder-port $a$, the flame would enter the escape passage or port 15 and pass out to the air. It could not pass beyond this escape-port into the supply-passage P', because the port $c$ is closed by a portion, N', of the valve, and because the pressure carrying the flame would end in the escape-port, which separates the two supply-ports. I also found that when the pressure in the combustion or power chamber had been reduced by reason of the opening of the exhaust-ports below the pressure in the supply-passage the gases from the latter would rush into the combustion-chamber and become prematurely ignited, and the flame would be transmitted under the valve back into the reservoir. My improvement overcomes this very serious defect by a positively-moving valve, and which cannot be opened by the varying pressures of the gas, but which is controlled solely by the connecting mechanism, and is only opened at the proper time.

Any positively-moving valve having substantially the functions I have pointed out will be the equivalent, and may be used instead of a sliding or plunger valve.

The piston U is of the trunk form, and may have any suitable pitman connection with the crank-shaft. The connection shown is preferred, because its construction is such as to provide for taking up lost motion from one end of the connecting-rod, to provide a frictionless bearing for the piston and an oiled bearing for the crank, in which the bearing-seats are made self-adjusting; but as these matters form the subject of a separate application for a patent by me a more specific description is deemed unnecessary herein. It is important, however, that the operating connection with the piston should be by a frictionless bearing, that the crank-pin should be lubricated, and that the valve and its connections should be oiled by automatic means, so as to require no attention and to reduce the friction of the connections, so that the engine will work with a perfectly easy movement.

In Figs. 1 and 2 of the drawings I have shown the frictionless bearing of the connecting-rod with the piston, which consists of an inner bearing-block, 25, on the upper end of the abutment-rod I, and an outer bearing-block, 26, and a knife-edge bearing-piece, 27, secured to the piston between the bearing-blocks 26 and 27, the latter of which is secured within openings in two tie-rods, 28 and 29, the lower ends of which are secured to the crank-pin bearing-boxes. The knife-edge piece 27 of the piston has its under bearing upon the lower block, 25, made convex, and its upper knife-edge bears in a V-shaped groove in the upper block, 26, these two bearing-blocks being retained in position by the tie rods. The pushing-strains are resisted by the abutment-rod I, and the pulling-strains upon the abutment-rod are resisted by the two tie-rods, which are formed with enlarged open ends, so as to receive the bearing-boxes of the crank-pin and the knife-edge bearing device for the piston. As the connecting-rod I swings back and forth, the upper block, 26, will rock upon the knife-edge bearing-piece 27, and that the lower bearing-block will roll upon its convex surface, and hence there will be no sliding movements of these parts and no friction or wear, so that they will require no oil; but the piston, the valve, their operating connections, and the crank-shaft are oiled by the operation of the engine, and in this particular the operation of the engine is facilitated, the frictionless bearing, which requires no oiling, co-operating to facilitate the operation with the parts, which are made self-oiling.

The compression-chamber F is supplied with a combustible mixture by a mixing-valve placed externally thereto, adapted to automatically regulate the relative proportional supply of gas and air to the power-cylinder, so that the charge of combustible mixture shall be of uniform quality and density. This mixing device forms an attachment for the compression-pump of the engine, as seen in Fig. 2, the connection with the compression-pump being made at 18, so that the pump draws its charge through the mixing device, which connects with the gas supply pipe at 19, and has a perpetual open air-inlet at 20. The case $e$ of the device is formed with an interior chamber, $f$, and two valve-ports. $g$ and $h$, of unequal area, with which a conical valve of corresponding separate valve-seats, $i$ and $j$, operates vertically by its weight to control the flow of gas through the smaller valve-seat, $h$, and to control the flow of air through the larger valve-seat, $g$. In the construction shown the chamber $f$ is formed between the valve-seats, and the larger of the latter is directly above the smaller, the valve being central with both. The case $e$ is preferably of circular form, and has a horizontal partition-plate, $k$, which forms the bottom of the chamber $f$, and has a central opening, $h$, which opens in the small upward-flaring valve-seat and into said chamber, and communicates with the gas-supply passage 19 in said partition-plate. The chamber is supplied with air through a series of openings, $f'$, in the bottom plate, $k$, which are made of definite size in relation to the gas-supply valve seat opening. The upper valve-seat, $i$, flares upward, and is formed in the top of the chamber $f$, and the valve has conical seats corresponding with the seat-openings, forming a lifting-valve guided by a fixed central pin upon which the valve is fitted. The valve-chamber is inclosed by a cover, which has the guide-pin for the valve. The supply of gas to the chamber is controlled by and regulated by a screw-plug, $l$, Fig. 2$^b$, fitted in a screw-threaded horizontal opening in the case, so that the inner end of said screw-plug crosses the central opening, $h$, below the lower valve-seat, and is set to open and to close said opening more or less, the adjustment of said plug being made from the outer side of the case, as seen in Fig. 2$^b$.

The supply of air to the chamber $f$ is controlled and regulated by a screw-cup, $m$, which screws into the lower open end of the case, so as to close more or less the openings in the bottom plate of said chamber $f$, the inner end of said cup for this purpose being formed with an inward projecting rim, $m'$, wide enough to close said openings $f'$, when the cup is driven up against the said bottom plate. In the operation of the mixer the force of the suction of the pump in drawing its supply through the device lifts the valve, so as to open communication of the compression-pump with the chamber $f$, which thereby opens communication of the gas and air passages $h f'$ with the said pump. Now, the relative quantity of gas and air that will be drawn into the chamber $f$ will depend upon the relative size of the supply-passage $h f'$. To increase the supply of gas, the screw-plug $l$ is drawn out to increase the area of the supply opening $h$, and the screw-cup $m$ is driven in to lessen the supply-openings $f'$. To increase the air-supply over the gas-supply, the reverse of these adjustments is made, and these adjustments may be made separately to regulate the supply of the gas or of the air. The double-seated valve is made of sufficient weight to greatly overcome the pressure of the gas in the pipe 19, so that whenever the device is in action the force of the suction will be considerable, and the slight variations in the pressure of the gas-supply usual in service-pipes of cities will therefore have little effect as compared with the suction of the pump in controlling the flow of the gas and air. It is therefore practically necessary only to consider the gas as having approximately the same pressure as the air, and the conditions are obtained whereby the two currents are drawn from separate supply-passages having substantially equal pressures into a chamber in communication with the compressor. Under these conditions the flow of each constituent will be proportional to the capacity of the supply-passages.

When the suction of the pump stops, the double-seated valve closes by its weight, cutting off both gas and air until the next action of the pump. As the sizes of the openings $h f'$ in the bottom of the chamber control the proportional flow of the constituents, the form of the valve seats should be such as to lift quickly and completely open the full capacity of the inlet-openings. I may, however, use any form of fuel-mixing device that will supply a mixture in definite proportions of gas and air, and I may use an independent compressor, if desired, to supply the combustible mixture to the engine.

The fly-wheel of the engine has preferably the governor device for governing the operation of the engine. In this governing device the fly-wheel has a radial pin, $n$, secured in the rim of the wheel, and, extending within the rim, terminates in an enlarged bearing end, $n'$, upon which a weight, $p$, is fitted, having a chamber, $q$, longer than the bearing of the pin-head. This construction gives the weight two cylindrical bearings, one upon the pin $n$ and the other upon its enlarged end $n'$, so as to make a free sliding joint for the weight thereon. The inner end of the chamber which forms the larger cylindrical bearing in the weight is closed by a plug, which has a central hole to receive the end of a link, $r$, which is connected to the weight by a pin, $s$. The weight-chamber forms an air-cushion, and for this purpose is divided by the head of the bearing-pin into two chambers, each of which forms an air-cushion upon the fixed head as the weight moves in and out to resist its motion. These two cushion-chambers communicate through the joint of the dividing-head, which is fitted sufficiently loose for that purpose, so that the air will slowly leak through said joint from one chamber to the other and allow of a perfectly easy motion of the weight when it moves slowly, but will offer considerable resistance to a rapid motion. Upon the hub of the wheel is fitted a freely-moving ring, $t$, Fig. 16, having a circumferential groove, $t'$, into which fits a pin, $u$, Fig. 1, on the lower end of a lever, $u'$, pivoted to the engine-frame at $u^2$, and having a free connection with the plug-valve Q. The ring has an interior projecting feather, $t^2$, which stands oblique to its axis and fits into a groove, $r'$, of the connecting-link. To retain the lower end of the link in position, it is fitted into a groove-bearing, $v$, formed in the side of the hub, as seen in Fig. 16, and thereby guide the link in its movements with the weight. A spiral spring, $w$, connects the free end of the link $r$ with the wheel-rim at a point diametrically opposite to the weight for the purpose of balancing the centrifugal force of the weight, and the tension of the spring is regulated by a screw and nut, $w'$. As the speed of the fly-wheel increases the weight $p$ will be moved outward with its link $r$, so that the groove $r'$ of the latter will move the ring $t$ by its feather-connection outward, and thereby operate the lever $u'$ so as to throw the plug-valve Q inward to close, according to the extent of its movement, the supply-port $b'$ to control the supply to the valve. As the speed of the wheel decreases, the opposite action takes place, and the supply to the cylinder is increased, and thereby increase the power of the engine. By this construction the governor device consists of only one weight and a single balancing-spring, and this simple retarding device is sufficient to prevent all vibrations of a single unbalanced weight without impairing the sensitiveness of the governor.

I have made provision for lubricating the bearings of the working parts of the engine, which provision I will now describe. The compression-chamber of the engine is supplied with a suitable quantity of oil, from which a portion is forced out and again sucked into it by the action of the compressor. A conduit, $x$, leads from the bottom of the compression-chamber to the bearing-surfaces to be lubricated. This conduit may consist of a tube, or of wall-passages, or of both, as shown. Surrounding the piston is a groove, $y$, formed in the inner wall of the cylinder, which communicates by a wall-passage, $z$, Fig. 1, with the chamber of the supply-valve, and into these the conduit opens. The drippings from the piston return to the compression-chamber F through the open end of the latter, while the drippings from the valve-moving parts fall into the closure L of the engine-frame along the valve-connecting rod M, its eccentric, and the bearings of the shaft and collect in the bottom of said closure. The wall which divides this closure from the compression-chamber has a passage, 21, Fig. 1, containing a check-valve, 22, which, while retaining the oil-supply in the compression-chamber, allows that which collects in the bottom of the closure to be returned by suction into the compression-chamber. As the compression-chamber contains the elastic gaseous fluid, the alternate pressure and suction in the chamber caused by the action of the piston causes the oil to flow from said chamber, and then to be drawn into it again in a circuit to and from the bearing-surfaces to be oiled. In this action the elastic fluid is first subjected to pressure, and then to suction, the first to cause the oil to be forced out through a series of passages connecting the bearing-surfaces, and the second to cause the elastic fluid to have a sucking action upon the drip from the outflow to return it to the source of supply through a passage controlled by a valve opened by the force of the suction and closed by its weight. It is obvious that the lubricating-circuit may be effected by an independent plunger working in a separate closure containing air instead of the compression-pump of the engine; but I prefer to use the compression-chamber as the pump, because such provision forms a part of the engine.

For regulating the quantity of the flow of the oil through the conduit a controlling-cock, 23, is provided in said conduit, as seen in Fig. 2.

In the operation of the engine, the piston, being on its upward stroke, draws into the compression-chamber through the mixing device a uniform combustible mixture in which the relative proportion of the gas and air are automatically and uniformly determined. The return-stroke of the piston compresses the mixture in the said chamber until the crank has nearly reached its lowest point and the exhaust-ports 2 are opened. While the ports 2 are still open the supply-valve opens to admit the charge into the combustion-chamber, as shown in Fig. 4, driving out the waste products from the cylinder through the exhaust-ports. The valve now closes the supply-ports $a$ and $c$, and the piston returning compresses the charge and begins its next forward stroke, when the charge is ignited, the valve being in the position shown in Figs. 5, 7, and 9, driving the piston forward. At this point in the operation of the engine it is of the greatest importance to prevent the leakage caused by back-pressure from fouling the succeeding charge; and referring to Fig. 5 it will be seen that the leakage from the cylinder-port $a$ passing the joint-forming valve-faces, will flow into the escape passage or ports 15, and thence to the open air through the escape-passage in the case, so that in no condition in the movements of the valve can the waste gases flow back into the supply-port. The provision by which this important result is effected serves also to prevent the flame from being communicated to the supply-chamber, because now, supposing the flame to run along the joint-forming faces of the valve from the cylinder-port, the flame would enter the escape passage or port and pass out to the air. It could not pass beyond the escape-port into the supply-passage, because the latter is closed by the portion N' of the valve, and because the pressure carrying the flame would end in the escape-port which separates the two supply-ports. The piston, continuing forward until it reaches the position shown in Figs. 1 and 2, begins to open the exhaust-ports and the waste gases escape through the exhaust-ports 2, the supply-valve at this time being closed and remains closed until the pressure in the cylinder has been reduced to that of the atmosphere, and until an interval of time has elapsed to allow the old charge to cool. This is important to prevent the premature ignition of the incoming charge from the hot gases which remain in the cylinder, because when the pressure in the cylinder is reduced by the escape of some of the hot gases the remaining gases do not long retain heat sufficient to endanger a premature ignition of the incoming charge. The supply-valve then opens and admits a new charge, which drives the remaining waste gases out, and the engine continues its operation, as stated. It will be seen that the valve on its forward movement operates its ports 4, 6, and 7, and then turns on its axis and returns, so that in its returning movement its ports are not again opened until on its next forward stroke, and it is this twisting and reciprocating movement which permits a single plunger-valve to perform its several functions on its forward stroke without repeating them on the return-stroke.

The quantity of the combustible for each charge is controlled automatically or otherwise by the governor, which opens and closes the passage $b$, connecting the compression-chamber with the supply-valve. When this passage is nearly closed by the valve Q, only a small quantity of combustible mixture can flow into the combustion-chamber from the compression-chamber, so that some of the mixture will remain under pressure in the supply-chamber and expand again as the piston moves upward. Under this expansion the mixing-valve will remain closed during a portion of the piston's movement, and upon completing its upward movement only a quantity of combustible mixture will be drawn in through the mixing-valve equal to that which flowed out of said chamber to make the charge in the cylinder. In this way a combustible mixture of uniform and constant proportions is supplied to the power-cylinder for all conditions in the operation of the engine, and therefore the operation of igniting the charge and the efficiency of the expanding gases will be the same whether the engine is running under a high or a lower power. In this operation the compression-pump co-operates with the governor in drawing exactly the quantity of the combustible mixture into the compression-chamber to make good the quantity taken out for each charge.

In cases where the engine is exposed to the collection of dirt and grit it may not be deemed advisable to return the oil which collects in the chamber L to the compression-chamber F, and in such case the valved passage 21 and 22 between the two chambers will not be used, and the chamber F will be supplied with oil as may be required, it being important to keep the oil free from grit.

Access to the chamber L is had by removable side plates.

I have shown and described herein various matters relating to separate and distinct operating parts of a gas-engine for which I have filed separate and distinct applications for patents under Serial Nos. 215,417, for fuel-mixing device, 215,421 for fly-wheel governor, 244,259, for igniter for gas-engines, and 242,063, for connecting-rods, and as to the matters embraced in these several applications I make no claim herein in so far as they do not relate to their co-operative relation and functions for carrying out the invention which constitutes the subject-matter of this application. As to the method of operating gas-engines which I have herein described, such invention forms the subject of a separate and distinct application for a patent filed by me of even date herewith, under Serial No. 215,420.

Referring to the means for lubricating the working parts of a gas-engine, the matter specifically claimed herein is limited to the combination of such means with a gas-engine; but broader claims for such device for use with gas and other engines and motors are made the subject of a separate and distinct application for a patent filed by me December 2, 1887, under Serial No. 257,123.

I do not confine myself to the precise devices or combination of devices herein described, since any devices or combination of devices having the functions substantially of those described may be employed without departing from the spirit or scope of my invention.

It will be observed that the fresh gases entering the combustion cylinder or chamber drive before them and out of the exhaust-ports the foul gases remaining in the chamber after combustion has taken place. This is due to the fact that the entrance and exhaust ports are substantially at opposite ends of said chamber and are both open simultaneously for a short period of time. In engines of this type the exhaust-ports are usually opened by the piston in what may be termed its "forward stroke," and I find it convenient to employ this term to designate the type of engine illustrated and described.

As in my improved method of operating a gas-engine, the compression-pump and the storage-reservoir are in free communication with each other; therefore when the power-cylinder has received only a small portion of the charge from the reservoir the balance of the gases therein will be retained and will expand back into the compression-chamber during a portion of the stroke of its piston, thus partially filling the compression-chamber from the gases in the reservoir until the pressure therein is reduced below that of the atmosphere. After this the piston begins to suck in a new charge through the mixing-valve to fill up the space made vacant by the remaining portion of the stroke of the piston. If in this operation the governor entirely closed the supply-passage at any stroke of the compressor, then the whole of the charge would be retained in the compression-chamber, and no new charge would enter through the mixing-valve at the next stroke of the compressor. On the contrary, the retained gases would simply expand and be again compressed until some of them were allowed to enter the power-cylinder, after which a new supply, just sufficient to supply consumption, would be drawn in by the next stroke of the compressor. It is evident that if a check-valve were placed between the compression-pump and the storage-reservoir the above-stated operation would be impossible, because such an intermediate valve would prevent the return of the charge from the reservoir into the compressor, and the compressor would only act to force all the charge taken in at the stroke into the reservoir, whether the charge in the latter had been used or not. This operation of my engine is important and advantageous in preventing the accumulation of the charge in the reservoir and avoiding the necessity of providing against an excessive pressure of the charge and providing an automatic means for regulating the supply.

Referring now to exhausting the waste gas from the power-cylinder, it will be understood that when the piston first opens the upper edge of the exhaust-ports the charge will rush out of the ports so quickly as to produce a shock and cause the pressure to be reduced to that of the atmosphere, and frequently produces a suction in the cylinder. Now, when a check-valve is used to admit the charge the fresh combustible mixture will instantly rush into the cylinder while the waste gases are still hot, and they will be ignited prematurely; but when the gases are prevented by my positively-moving valve from entering at this time until the shock of the exhaust is passed and the remaining gases are somewhat cooled, the new charge may then be admitted without danger of being prematurely ignited. The difference in time is small, but it corresponds to a considerable movement of the crank, and it is effective in securing the desired result.

In conclusion, I desire to explain that by the use of the term "a duct or passage of constant capacity" and similar and related expressions in this specification I intend to designate a passage which does not contain a device for governing or controlling the quantity of gas which will flow through it when open in a given interval of time, but one which, although it may only be opened intermittently, yet while open permits the same quantity of gas to flow through it during a given interval of time.

From the foregoing it is obvious that the upper and the lower parts of the compression-chamber F perform the functions of a compression-chamber and also of a compression-reservoir; but since they are constantly in free communication with each other they may also be properly treated as a single chamber.

I claim—

1. The combination, with a gas-engine, of a cylindrical plunger valve, and a case having ports for operating the engine, and operating-connections for said valve, consisting of the oblique eccentric, the strap therefor, and a connecting-rod pivoted to said strap and having a universal-joint connection with said valve, substantially as herein set forth.

2. The combination of the power-cylinder of a gas-engine, having exhaust-ports placed in the middle of its length, and having its supply-passage entering at its back end, with a piston controlling the discharge of the waste gases, a sliding supply-valve controlling the flow into said cylinder, actuated by positive connecting mechanism, a compressor supplying a uniform combustible mixture for the engine, a supply-passage conveying the mixture to the engine-valve, and a throttle-valve for said supply-passage, actuated by a governor, substantially as described.

3. The combination, with the power-cylinder of a gas engine, having ports opened by the piston on its forward stroke, and a compression-chamber, of a supply-passage leading from said chamber, a plunger-valve having provision for controlling the supply and igniting the charge, and an external lighter, substantially as herein set forth.

4. The combination, with a gas-engine, of a valve-chamber having a port entering the combustion-chamber, and a separate supply-port, a valve having bearing-faces operating said ports, an escape-passage, a cylinder having exhaust-ports uncovered by the piston on its forward stroke, and suitable valve-operating connections, substantially as herein set forth.

5. The combination, with the power-cylinder of a gas-engine, having exhaust-ports uncovered by the piston on its forward stroke, of a compression-chamber, a mixing valve supplying a uniform mixture, a governor controlling the flow from said chamber, and a plunger-valve supplying the charge, substantially as herein set forth.

6. The combination, with the power-cylinder of a gas-engine, of a slide-valve, a valve-case having a cylinder-port, a separate supply-port, and an escape-port separating said ports, substantially as herein set forth.

7. The combination, with the power-cylinder of a gas-engine, of a slide-valve having divided bearing-surfaces, a valve case having separate ports for the supply and for the combustion chamber, and an escape-port placed between them, substantially as described, for the purpose specified.

8. The combination, with the piston of a gas-engine, of a compression-chamber, a mixing supply-valve therefor, a supply plunger-valve, a fly-wheel governor, and a valve operated by the latter to control the flow from said compression-chamber to the supply-valve, substantially as described.

9. The combination, with the power-cylinder, the piston, and a supply slide-valve, of a plunger-chamber containing an elastic fluid and oil, and a supply-conduit leading from said chamber to the bearing-surfaces of said cylinder, piston, and valve, substantially as herein set forth.

10. The combination, with the power-cylinder, the piston, and the valve, of the compression-chamber containing oil, an elastic fluid, and the piston-operating connections, the chamber L, containing the valve-operating connections, and a conduit for oil leading from the compression-chamber to the bearing-surfaces of said cylinder, piston, and valve, substantially as herein set forth.

11. The combination, with the power-cylinder, the piston, the slide-valve, and the operating-connections for the working parts, of the engine-frame having a compression-chamber containing an elastic fluid and oil, and inclosing the piston-operating connection, and also having a chamber inclosing the valve-operating connections, a conduit for the oil leading from the compression-chamber, and a valve-controlled communication between the said chambers, substantially as described, for the purpose specified.

12. The combination, with the power-cylinder having the inner wall-groove, $y$, and a supply slide-valve having a wall-passage, $z$, leading to said groove, of the compression-chamber F, containing an elastic fluid and oil, and a tube leading therefrom to the said wall-passage, substantially as described, for the purpose specified.

13. An engine-frame having the chambers F and L, the former containing an elastic fluid and oil, in combination with the power-cylinder, the piston, the supply-valve, the conduit $y\ z$, for supplying oil to the operating parts, the check-valve 22, and the cock 23, substantially as herein set forth.

14. The combination, with the power cylinder, the piston, and the supply-valve, of a compression-chamber, of which the piston forms the compressor, having a mixing-valve supplying a uniform mixture, a valve-controlled supply-passage for the power-cylinder, and an automatically oil-supplying conduit for the cylinder, and valve N, controlled by said piston, substantially as herein set forth.

15. The combination, with the piston and other working parts of a gas-engine, of a plunger-chamber containing an elastic fluid and oil, and a supply-conduit for the oil leading from said chamber to the bearing-surfaces to be lubricated, whereby the oil is forced through said passage by the gas under the action of the piston, substantially as described.

16. The combination of the power-cylinder of a gas engine, having exhaust-ports placed in the middle of its length, having its supply-passage entering at its back end, and a compression-chamber at its forward end forming a reservoir for the compressed charge, with a piston controlling the discharge of the waste gases and compressing the combustible mixture on its forward stroke, a supply-passage leading to the main valve, having a throttle-valve controlled by a governor, and a sliding supply-valve controlling the flow into said cylinder supply-passage, actuated by positive connecting mechanism, substantially as described.

17. In a gas-engine, a compression-chamber and a reservoir constantly in free communication therewith, combined with ports provided with a valve for controlling the supply of the mixture to the reservoir solely by the back expansion of the gases contained in said reservoir, substantially as described.

18. In a gas engine, a compression-chamber, a reservoir constantly in free communication therewith, and an automatic governor combined with ports, and provided with a valve for automatically controlling the supply of mixture to the reservoir solely by the back expansion of the gases contained in said reservoir, substantially as described.

19. In a gas-engine, the combination of an entrance-passage of constant capacity, a compression-chamber in free communication with a reservoir, a combustion-chamber, and a conduit provided with a valve for controlling its capacity, leading from said compression-chamber to said combustion-chamber, substantially as described.

20. In a gas-engine, the combination of an entrance-passage of constant capacity controlled by a check-valve, a compression-chamber in free communication with the reservoir, a combustion-chamber, and a conduit provided with a valve for controlling its capacity, leading from said compression-chamber to said combustion-chamber, substantially as described.

21. In a gas-engine, a combustion-chamber having entrance and discharge ports at opposite ends of said chamber, both open at the same time, combined with a compression-chamber, and a reservoir in free communication therewith, a conduit connecting said combustion-chamber and said compression-chamber, provided with a valve for automatically-closing said conduit, and a valve controlled by an automatic governor for controlling the capacity of said conduit, substantially as described.

22. In a gas-engine, a combustion-chamber having entrance and discharge ports at opposite ends of said chamber, both open at the same time, combined with a positively-moving supply-valve, a compression-chamber, and a conduit provided with an automatic governor for controlling its capacity, connecting said compression-chamber and said combustion-chamber, substantially as described.

23. In a gas-engine, a combustion-chamber having entrance and discharge ports at opposite ends of said chamber, both open at the same time, combined with a valve operating to stop the flow of gas during an interval of time between the reduction of the old charge within the said chamber to atmospheric pressure and an introduction therein of a fresh charge, for the purpose set forth.

24. In a gas-engine, a combustion-chamber having entrance and discharge ports at opposite ends of said chamber, both open at the same time, combined with a positively-moving supply-valve operating to cause an interval of time to elapse between the reduction of the old charge in said chamber to atmospheric pressure and the introduction therein of a fresh charge, for the purpose set forth.

25. In a gas-engine, a combustion-chamber having entrance and discharge ports at opposite ends of said chamber, both open at the same time, combined with a valve for controlling the supply-passage of said chamber, said valve being provided with an escape-passage, substantially as and for the purpose set forth.

26. In a gas engine, the combination of a compression-chamber and a reservoir constantly in free communication therewith, gas and air supply ducts, and a valve, said gas and air supply ducts and said valve all being controlled by the back expansion of gas contained in said chamber, substantially as described.

27. In a gas-engine, a compression-chamber, and a reservoir constantly in free communication therewith, combined with ports provided with a valve for controlling both the density of the gas admitted to said chamber and also the volume thereof by means of the back expansion of gas contained therein, substantially as described.

28. The combination, with the piston and other working parts of a gas-engine, of a plunger-chamber containing an elastic fluid and oil, and a supply-conduit for the oil leading from said chamber to the bearing-surfaces to be lubricated, whereby oil is forced through said passage by the action of the piston, substantially as described.

29. The combination, with the piston and other working parts of a gas-engine, of a plunger-chamber containing an elastic fluid and oil, and a plurality of conduits for the oil leading from said chamber to the bearing-surfaces to be lubricated and back to said chamber, whereby oil is forced through said passage by the action of the piston, substantially as described.

30. The combination of the power-cylinder and piston of a gas-engine with a compression-pump, a reservoir into which each charge is compressed, having free communication with said compression-pump, and a governor controlling the quantity of the charge from said compression-pump, whereby the excess of the charge contained in the reservoir expands upon the back-stroke of the piston to properly limit the supply for said reservoir for supplying the engine.

In testimony whereof I have hereunto set my hand in the presence of two subscribing witnesses.

LEWIS HALLOCK NASH.

Witnesses:
A. E. H. JOHNSON,
BESSIE B. JOHNSON.